(12) United States Patent
Powers et al.

(10) Patent No.: US 12,380,658 B2
(45) Date of Patent: Aug. 5, 2025

(54) DEEP INERTIAL PREDICTION SYSTEM AND METHODS

(71) Applicant: Arcturus Industries LLC, Fulshear, TX (US)

(72) Inventors: Jeffrey Roger Powers, Houston, TX (US); Anatoly Stanislavovich Baksheev, Málaga (ES); Martin Christophe Laurent Brossard, Madrid (ES)

(73) Assignee: Arcturus Industries LLC, Fulshear, TX (US)

( * ) Notice: Subject to any disclaimer, the term of this patent is extended or adjusted under 35 U.S.C. 154(b) by 182 days.

(21) Appl. No.: 18/159,358

(22) Filed: Jan. 25, 2023

(65) Prior Publication Data

US 2023/0260227 A1    Aug. 17, 2023

Related U.S. Application Data

(60) Provisional application No. 63/267,150, filed on Jan. 26, 2022, provisional application No. 63/267,175, filed on Jan. 26, 2022.

(51) Int. Cl.
*G06F 3/01* (2006.01)
*G06T 19/00* (2011.01)

(52) U.S. Cl.
CPC ............ *G06T 19/006* (2013.01); *G06F 3/011* (2013.01)

(58) Field of Classification Search
CPC ......... G06F 3/012; G06F 3/011; G06T 19/006
USPC ........................................................ 345/418
See application file for complete search history.

(56) References Cited

U.S. PATENT DOCUMENTS

| | | | |
|---|---|---|---|
| 11,199,853 B1* | 12/2021 | Afrouzi ................. | B25J 13/006 |
| 12,092,467 B1* | 9/2024 | Ebrahimi Afrouzi ..... | G06T 7/70 |
| 2017/0113702 A1* | 4/2017 | Thieberger-Navon ...................... B60W 50/0097 | |
| 2020/0207474 A1* | 7/2020 | Foggia ................. | G05D 1/0676 |
| 2021/0089040 A1* | 3/2021 | Ebrahimi Afrouzi ........................ A47L 9/2873 | |
| 2024/0053770 A1* | 2/2024 | Patel ....................... | G05D 1/82 |

OTHER PUBLICATIONS

Wang R, Zou D, Pei L, Liu P, Xu C. Velocity prediction for multi-rotor UAVs based on machine learning. InChina Satellite Navigation Conference (CSNC) 2016 Proceedings: vol. II 2016 (pp. 487-500). Springer Singapore.*

Nobrega JP, Oliveira AL. A sequential learning method with Kalman filter and extreme learning machine for regression and time series forecasting. Neurocomputing. Apr. 14, 2019;337:235-50.*

\* cited by examiner

*Primary Examiner* — Phu K Nguyen
(74) *Attorney, Agent, or Firm* — Lee & Hayes, P.C.

(57) ABSTRACT

A system configured to determine poses of a tracked device in a physical environment and to utilize the poses as an input to control or manipulate a virtual environment or mixed reality environment. In some cases, the system may include a fall back tracking system for when the main tracking system loses visual tracking of the tracked device.

20 Claims, 6 Drawing Sheets

DEEP INERTIAL PREDICTION SYSTEM AND METHODS

CROSS-REFERENCE TO RELATED APPLICATIONS

This application claims priority to U.S. Provisional Application No. 63/267,150 filed on Jan. 26, 2022 and entitled "DEEP INERTIAL PREDICTION SYSTEM AND METHODS" and U.S. Provisional Application No. 63/267,175 filed on Jan. 26, 2022 and entitled "DEEP INERTIAL PREDICTION SYSTEM AND METHODS", which are incorporated herein by reference in their entirety.

BACKGROUND

The presence of three dimensional (3D) imaging and virtual reality systems in today's world is becoming more and more common. In some cases, the imaging system or virtual reality system may be configured to allow a user to interact with the virtual environment based on the pose or position of one or more hand-held controllers relative to the user and/or objects within the virtual environment. Conventional systems, typically track a pose of the controller or other device by capturing frames representing the controller and updating the pose based on the data represented in the captured frames. Unfortunately, during use the controller or other device often becomes obstructed or otherwise exits the field of view of the available image devices resulting in a loss of tracking.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
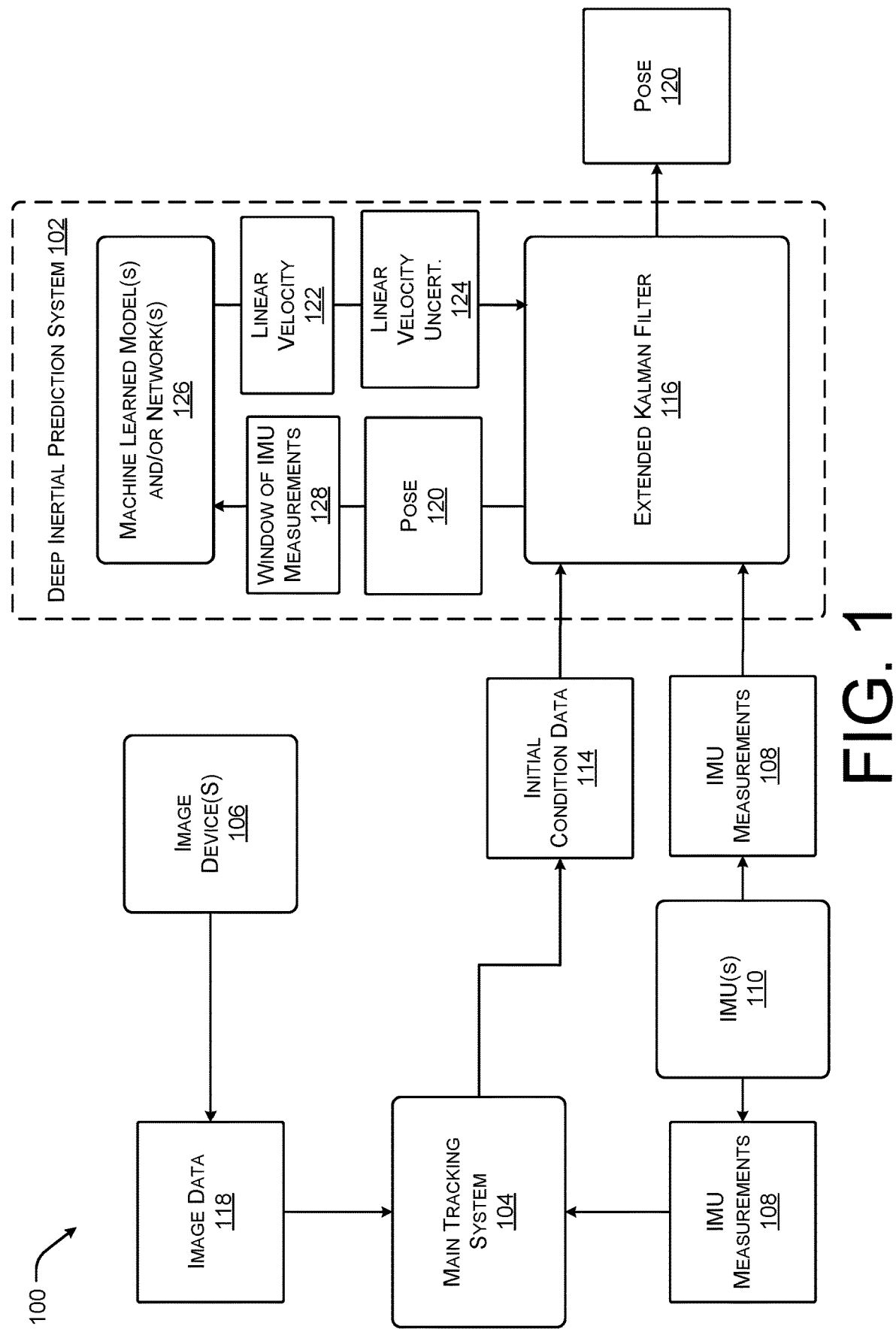
FIG. 1 is an example pictorial diagram of an extended reality system including a deep inertial prediction system according to some implementations.

This disclosure includes techniques and implementations for determining current or predicted future six-degree of freedom (6DOF) poses of one or more devices, such one or more controllers (e.g., a single controller or a pair of hand-held controllers), associated with a virtual, mixed, immersive, and/or extended reality system. For example, an image system or extended reality system, such as a headset device, may be configured to allow a user to interact with objects in a virtual world or environment based at least in part on the pose of the controllers. For instance, the headset device may be configured to utilize the pose of the controllers as a control input or user input with respect to the portion of the extended environment currently visible to the user via the headset device. In order to determine the pose of the controllers, the headset device may include one or more image components or devices to capture image data of the physical environment including image data of each of the controllers currently being operated by the user.

As discussed herein, the extended reality system may utilize a main tracking system that relies on frame data representing the controller or device from one or more image devices and/or sensor data, such as orientation and/or position data from one or more inertial measurement units (IMUs), gyroscopes, accelerometers, magnetometers, or a combination thereof in a main tracking system. However, in various situations, the extended reality system may lose image data of one or more of the controllers (e.g., an image device is obstructed, the controller is positioned out of the field of view of the image devices, and/or the like). In these cases, the extended reality system, discussed herein, may utilize a deep inertial prediction system as a fall back process. Accordingly, the extended reality system may utilize the deep inertial prediction system when the main tracking system is unable to provide a pose within a desired confidence threshold (e.g., the drift or error in the pose estimate is greater than or equal to a threshold).

In some implementations, the deep inertial prediction system may be initialized from the main tracking system state information, status (e.g., tracking status), or prior pose, such as the prior six degree of freedom (6DOF pose) (e.g., a last pose meeting or exceeding the desired confidence threshold). As the deep inertial prediction system, discussed herein, maintains the tracking after the loss by the main tracking system, the user may remain unaware that tracking was lost and continue to consume the extended reality environment. Thus, unlike conventional systems that may cause the extended reality environment to pause, ask for re-initialization of the pose tracking, or the like, the extended reality system including the fall back deep inertial prediction system, discussed herein, allows for a more seamless, less interrupted user experience.

In some examples, the deep inertial prediction system may receive sensor data (e.g., position, orientation, acceleration, or other IMU related data) from one or more orientation and/or position sensors, such as one or more IMUs, associated with the controller or device being tracked. However, unlike conventional IMU tracking systems that are configured for long distances (e.g., long walks or larger areas traversed by the user) and, accordingly, attempt to minimize drift, the deep inertial prediction system, discussed herein, is configured to maintain tracking for small motions around a substantially fixed viewpoint (e.g., within a threshold distance of the prior pose, such as when the user moves their heads causing the controller to move out of view of the head set device, or the user obstructs the controller, such as by placing a hand over the image device or between the controller and the image device, or the like) for smaller periods of time (e.g., until the main tracking system reengages). In these cases, the deep inertial prediction system, discussed herein, favors higher levels of accuracy at a smaller scale.

In some implementations, the deep inertial prediction system may utilize a machine learned models and networks, such as a convolutional neural network (CNN), trained to compute linear velocity and linear velocity uncertainties from a window (or set) of past IMU measurements together with one or more extended Kalman Filter (EKF) configured to output a 6DOF pose by integrating the current IMU data and regressing the CNN velocities as a measurement. For example, the EKF may be partitioned into two components. The first components may be a prediction model for processing the EFK state (e.g., the IMU integration data) and the second components may be an observation model to process the IMU measurements. In some cases, the EFK may adjust the EFK outputs (e.g., the values of the IMU measurements, the window of IMU measurements, and/or the EFK state) by comparing the output of the prediction model with the output of the observation model. The state data (e.g., the 6DOF pose) may also be input to the machine learned models and networks (e.g., the CNN) to reduce error associated with the IMU measurements over the window (e.g., by removing biases and applying a gravity correction to the IMU measurements). For example, the CNN may utilize the IMU bias estimates of state data to correct IMU measurements.

As an illustrative example, upon the main tracking system of the extended reality system losing tracking, the deep inertial prediction system may engage the EKF (or other state estimator, state generator, or a sensor-fusion component) to perform EKF updates. For example, the EFK or other state estimator may be a component to combine data derived from disparate sources, such that the resulting stat has less uncertainty than when the data from the sources are utilized independently. The EKF may be configured to initialize the EKF state from a current state of the main tracker (such as the prior pose data) and the EKF covariance to fixed uncertainties (such as predetermined uncertainties determined, for example, by trial and error testing). Once initialized, the EKF may integrate incoming IMU measurements via a filter (such as trapezoidal IMU integration) and compute an EKF update using the EFK state and a CNN measurement from the CNN (or other machine learned models or networks). For example, the CNN measurements may include one or more of an estimate of a linear velocity of the IMU (e.g., gravity aligned and without yaw), an estimate of an uncertainty of the estimate of the linear velocity.

In some cases, measurements and process noise values are set to allow smooth pose correction during EKF update. For instance, parameters are selected to allow smooth (nonvisible) pose correction during the EKF updates. The EKF state may then be determined during the EKF update based at least in part on the estimate of a linear velocity of the IMU and/or the estimate of the uncertainty of the estimate of the linear velocity received from the CNN. As another example, the measurements and process noise values may first be determined with IMU data (or other sensor data, datasheets, or the like) or covariance of CNN velocity error. the measurements and process noise values are then tuned (generally inflated) for taking into account correlation and for smoothing corrections. Upon completion of an EKF update, the EKF may generate an estimate a 6DOF pose, velocity, gravity, and IMU biases at given timestamps (such as current and/or future times) for the controller.

The CNN (or other machine learned models and/or networks, such as other deep neural networks) may compute the estimate of a linear velocity of the IMU and the estimate of the uncertainty of the estimate of the linear velocity, as discussed above. For example, the CNN may take as an input a history or past IMU measurements (e.g., as within a window from the current IMU measurement, such as 1 second, 2 seconds, 3 seconds, 3.6 seconds, 4 seconds, or between 1 and 5 seconds, and the like). The CNN may then transform the past IMU measurements in a gravity aligned frame after removing biases and applying a gravity correction (based on current bias estimates from the EKF update). In some cases, the past IMU measurements may have subtracted yaws to eliminate dependence of the direction (e.g., the direction of travel of the user). In some cases, the CNN may have a topology based at least in part on a gaussian error linear units (GELU) non-linearity and dropouts configuration of the CNN, a residual neural network, or other machine learned models. As discussed herein, it should be understood that the frequency of the CNN measurements or outputs may differ from the frequency of the IMU and/or the EKF updates.

In some examples, the CNN or other machine learned models may be trained using IMU measurements, poses, and velocity data. In some cases, training the CNN may include trajectories based on realistic (or historic) virtual reality or augmented reality motion. The system discussed herein may utilize simulated motion data based on real virtual reality or augmented reality trajectories to improve training data sets. Accordingly, a data generation system may be used in conjunction with the CNN or other deep neural network to generate datasets usable to improve the overall training. For example, the data generation system may receive discrete poses associated with a user in an extended reality environment (such as at 200 hz). The data generation system may then generate continuous position and orientation data from the discrete poses, such as via a cubic three-dimensional (3D) B-spline function. The continuous position and orientation data may then be used to generate ground-truth poses (for instance including IMU measurements, angular velocity, acceleration) at 1000 hz that may be utilized to train the CNN or other machine learned models and networks usable in the deep inertial prediction system.

The data generation system may also modify the ground-truth poses by adding errors and noise. The errors and noise ensures the training data is more representative of real life applications (e.g., non-simulated data). The data generation system may also inject variable-duration tracking loss at different moments (such as based on real tracking system failures or at random event times). In this manner, the CNN or other machine learned models may be trained using a combination of simulated or synthetic poses and IMU measurements that are based on real user trajectories which infer linear velocity, gravity aligned frames, and/o gravity aligned IMU measurements in a physical space.

During training, the data generation system may also apply data augmentation to the trajectories and/or on the IMU measurements or data. For example, the data generation system may apply physical world pitch and roll transformations, IMU pitch and roll transformations, time stretching to extend the trajectories, and the like. As one illustrative example, the data generation system augmenting the IMU pitch and roll with transformations allows the system to generate a richer initial device orientation and, accordingly, allows the training data to represent more possible user motions for the CNN or other machine learned models and networks to learn. As another illustrative example, applying time stretching to the trajectories allows the system to generate slower or faster motion patterns from the recordings of physical motion and trajectories. Accordingly, the dataset being generated for training again includes a richer set of user motions and trajectories for the CNN or other machine learned models and networks to learn.

In some implementations, the data generation system may apply white Gaussian IMU noise, IMU biases, and/or IMU intrinsic (e.g., scale factors, cross-axes, and the like) to improve the IMU measurements, such that the full data augmentation pipeline of the data generation system may represent errors to the IMU measurements in a more realistic manner. For instance, the addition of such errors to the IMU measurements and data assists the CNN or other machine learned models and networks adapting to real world data. Additionally, some data augmentations, such as adding IMU bias error, may also be applied to real IMU data to obtain more diversity in the training data for the CNN or other machine learned models and networks.

Although discussed in the context of CNN or other deep neural network, any type of machine learning may be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing technique and/or a combination thereof.

FIG. 1 is an example pictorial diagram of an extended reality system 100 including a deep inertial prediction system 102 according to some implementations. As discussed above, an extended reality system 100 (such as an extended reality headset device) may track one or more associated devices (such as one or more hand-held controllers) to, for instance, utilize the controller or controllers pose as an input controller such as together with a user input via a user interface (e.g., a trigger) on the controller. The extended reality system 100 may utilize a main tracking system 104 (such as a simultaneous location and mapping (SLAM) system) that determines a pose of the associated device based at least in part on image data 118 representing the device received from one or more image devices 106 associated with the system 100 and/or IMU measurements from one or more IMUs 110.

However, as discussed above, in some cases, the associated device may leave the field of view of the image device 106 (e.g., an image device 106 of the extended reality system 100 or the associated device is obstructed, the associated device is positioned out of the field of view of the image devices 106, and/or the like). In these situations, the extended reality system 100 may include a fall back or secondary tracking system, such as the deep inertial prediction system 102.

In some implementations, the deep inertial prediction system 102 may be initialized from initial condition data 112 (e.g., status or prior pose of the main tracking system 104). The deep inertial prediction system 102 may also receive IMU measurements 108 from the IMUs 110 associated with the device being tracked. In the current example, upon the main tracking system 104 of the extended reality system 100 losing tracking, both the initial condition data 114 and the IMU measurements 108 are received and processed by a EKF 116.

The EKF 116 may perform EKF updates to generate or otherwise output a pose 120 of the associated device. The EKF 116 may be configured to initialize the EKF state from the initial condition data 114 of the main tracking system 104 (such as the prior pose data) and an EKF covariance that is set to fixed uncertainties. Once initialized, the EKF 116 may integrate incoming IMU measurements 108 via a filter (such as trapezoidal IMU integration) and compute an EKF update using the integrated IMU measurements, a linear velocity 122, and linear velocity uncertainness 124 output from a machine learned model and/or network 126 (such as a CNN or other deep neural network). For example, the estimate of a linear velocity 122 may be for the IMU measurements 108 that are, for instance, gravity aligned and without yaw and linear velocity uncertainty may be an estimate of the uncertainty of the estimate of the linear velocity 122.

In some implementations, the machine learned models and networks 126 may trained to compute the linear velocity 122 and the linear velocity uncertainties 124 from a window (or set) of past IMU measurements 128 and the pose 120 output by the EKF 116. For example, the pose 120 may be input to the machine learned models and networks 126 to reduce error associated with the window of IMU measurements 128 (e.g., by removing biases and applying a gravity correction to each of the IMU measurements included in the window 128).

Figure 2:
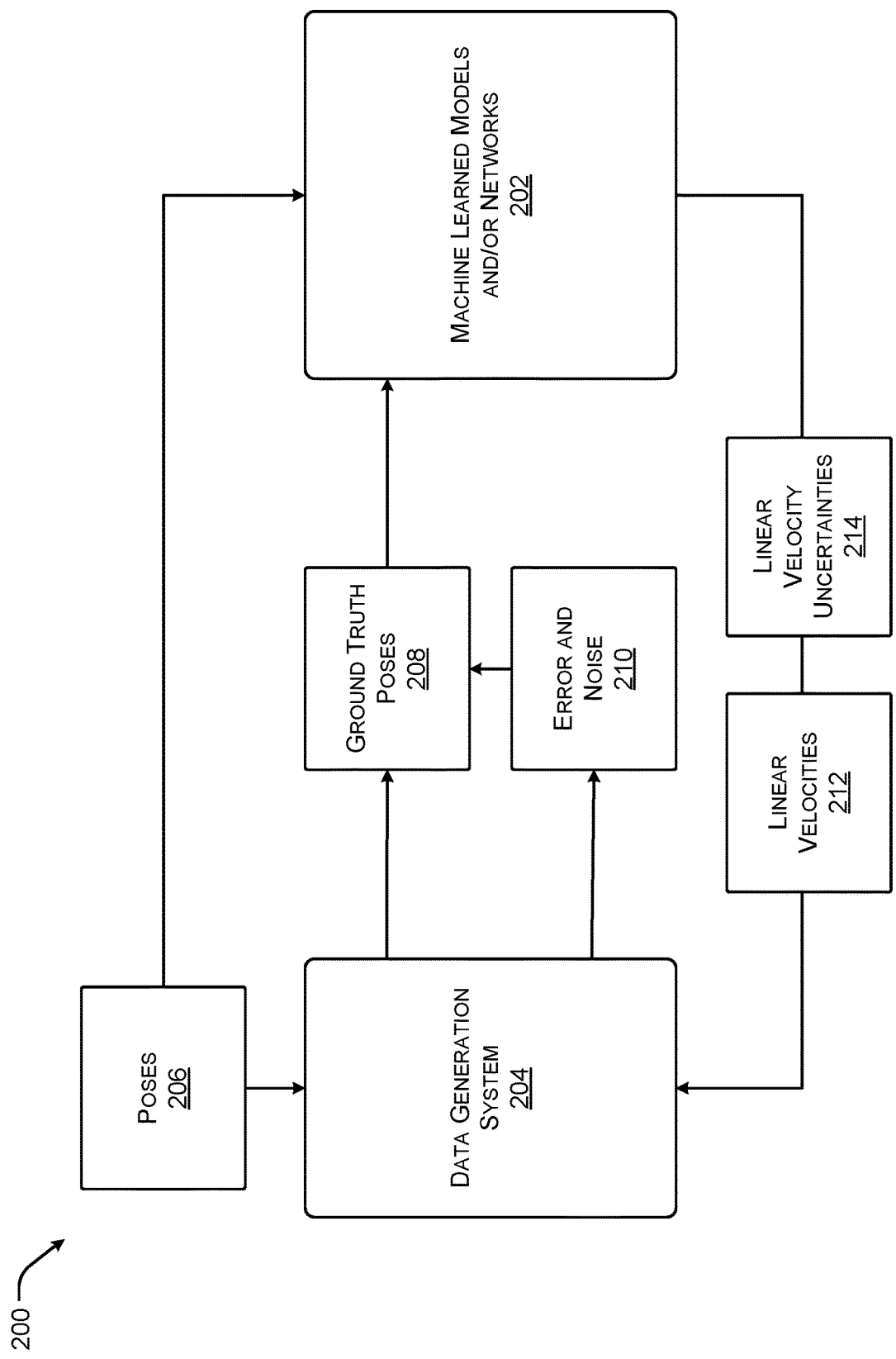
FIG. 2 is an example pictorial diagram of the data generation system for the machine learned models and/or networks of the deep inertial prediction system according to some implementations.

FIG. 2 is an example pictorial diagram of the training system 200 for the machine learned models and/or networks 202 of the deep inertial prediction system of FIG. 1 according to some implementations. As discussed above, the CNN or other machine learned models and/or networks 202 may be trained using IMU measurements, poses, and velocity data. In some cases, training the machine learned models and/or networks 202 may include trajectories received or recorded as part of extended reality sessions. A data generation system 204 may receive discrete poses 206 associated with a user in an extended reality environment (such as at 200 hz). The data generation system 204 may then generate continuous position and orientation data from the discrete poses, such as via a cubic three-dimensional (3D) B-spline function. The continuous position and orientation data may then be used to generate ground-truth poses 208 (for instance including IMU measurements, angular velocity, acceleration) at 1000 hz that may be utilized to train the machine learned models and/or networks 202 usable in the deep inertial prediction system.

The data generation system 204 may also modify the ground-truth poses 206 by adding errors and noise 210. The errors and noise 210 ensures the ground-truth poses 206 are more representative of real life applications (e.g., non-simulated/non-synthetic data). The data generation system 204 may also inject variable-duration tracking loss at different moments (such as based on real tracking system failures or at random event times). In this manner, the machine learned models and/or networks 202 may be trained using a combination of simulated or synthetic poses 208 and recorded poses 206.

During training, the data generation system 204 may also apply data augmentation to the trajectories and/or on the IMU measurements or data. For example, the data generation system 204 may apply world pitch and roll transformations, IMU pitch and roll transformations, time stretching to extend the trajectories, and the like. As one illustrative example, the data generation system 206 augmenting the IMU pitch and roll with transformations allows the data generation system 206 to generate a richer initial device orientation and, accordingly, allows the training data to represent more possible user motions. As another illustrative example, applying time stretching to the trajectories of the poses 206 and/or 208 allows the data generation system 206 to generate slower or faster motion patterns from the recordings of physical motion and trajectories. Accordingly, the dataset being generated for training again includes a richer set of user motions and trajectories.

In some implementations, the data generation system 206 may apply white Gaussian IMU noise, IMU biases, and/or IMU intrinsic (e.g., scale factors, cross-axes, and the like) to improve the ground truth poses 208, such that the poses 208 represent errors to the IMU measurements in a more realistic manner. For instance, the addition of such errors to the IMU measurements and data assist the machine learned models and/or networks 202 to adapt to real world data. Additionally, some data augmentations, such as adding IMU bias error ot the ground truth poses 208, may also be applied to IMU data of the poses 206 to obtain more diversity in the training the machine learned models and/or networks 202.

In the current example, the data generation system 204 may also utilize the output linear velocities 212 and linear velocity uncertainties 214 during augmentation of the ground truth poses 208 to further improve the overall training of the machine learned models and/or networks 202.

Figure 3:
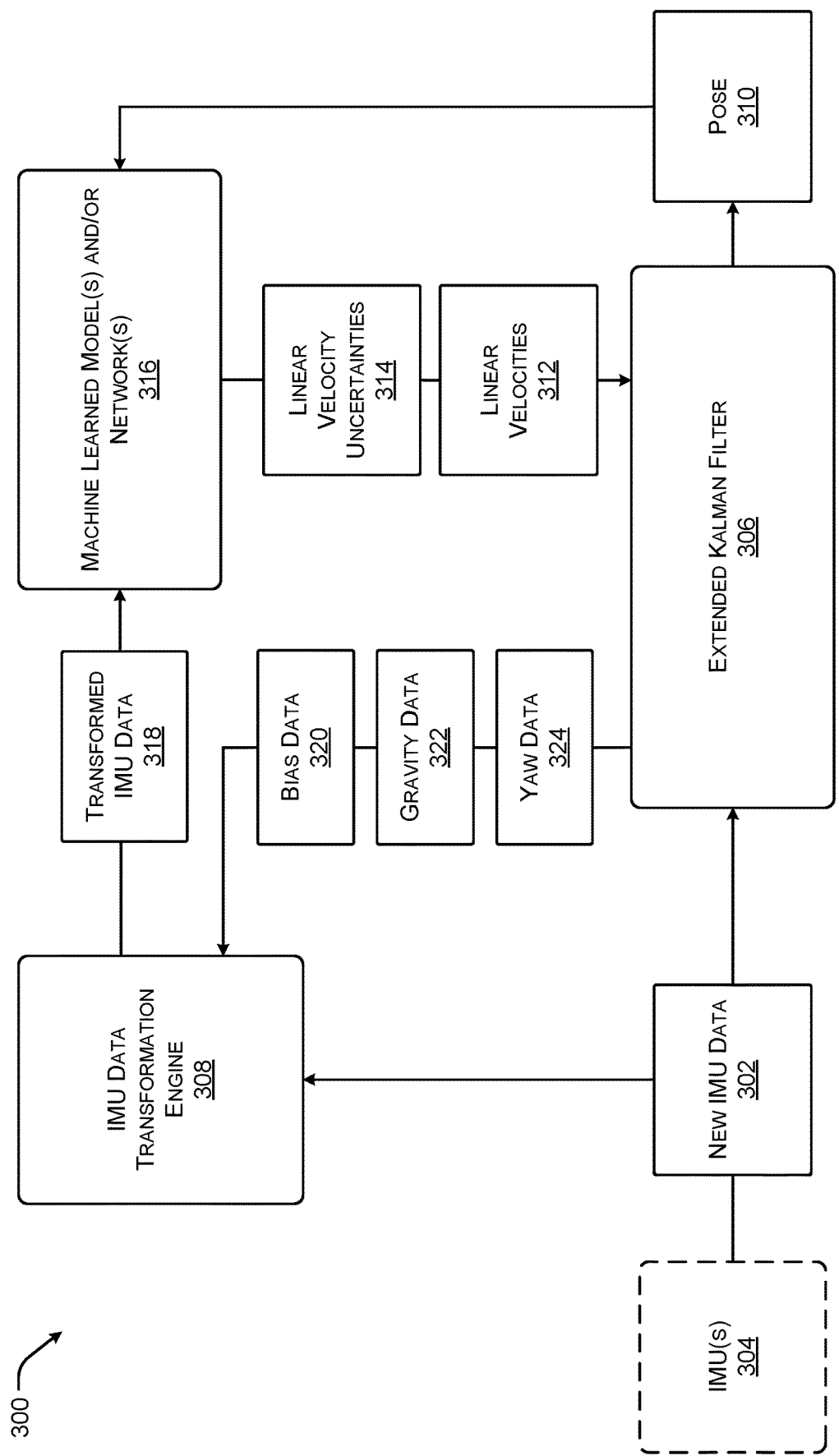
FIG. 3 is an example pictorial diagram of the deep inertial prediction system according to some implementations.

FIG. 3 is an example pictorial diagram of a deep inertial prediction system 300 according to some implementations. As discussed above, an extended reality system (such as an extended reality headset device) may track poses of one or more associated devices. The extended reality system may utilize a main tracking system (not shown) that determines a pose of the associated device based at least in part on image data representing the device. However, in some situations, the associated device may leave the field of view of the image device causing a tracking loss via the main tracking system. In these situations, the extended reality system may include a fallback or secondary tracking system, such as the deep inertial prediction system 300.

The deep inertial prediction system 300 may be initialized from initial condition data (e.g., status or prior pose of the main tracking system). The deep inertial prediction system 300 may also receive new IMU data or measurements 302 (e.g. for each period of time associated with tracking the pose of the associated device) from one or more IMUs 304 associated with the associated device being tracked. The IMU data 302 may be received and processed by a EKF 306 as well as by an IMU data transformation engine 308.

The EKF 306 may perform EKF updates to generate or otherwise output a pose 310 of the associated device to other systems of the extended reality system. The EKF 306 may be configured to initialize the EKF state from the initial condition data of the main tracking system and an EKF covariance that is set to fixed uncertainties. Once initialized, the EKF 306 may integrate incoming new IMU data or measurements 302 via a filter (such as trapezoidal IMU integration) and compute an EKF update using the IMU data 302 as well as a linear velocity 312 and linear velocity uncertainness 314 output from a machine learned model and/or network 316 (such as a CNN or other deep neural network). For example, the estimate of a linear velocity 312 may be based on transformed IMU data 318 output by the IMU data transformation engine 308. For instance, the IMU data transformation engine 308 may receive bias data 320 (e.g., EKF biases), gravity data 322 (e.g., EKF gravity rotation and normals), and yaw data 324 (e.g., live yaw data). The IMU data transformation engine 308 may than transform the new IMU data 302 based on the bias data 320, gravity data 322, and yaw data 324 to generate the transformed IMU data 318 (e.g., IMU measurements that are gravity aligned and without yaw).

The machine learned models and networks 316 may be trained to compute the linear velocity 312 and the linear velocity uncertainties 314 from a window (or set) of past IMU measurements (e.g., the transformed IMU data 318) and the prior pose output by the EKF 306. For example, the pose 120 may be input to the machine learned models and networks 316 for computation of a next pose to reduce error associated with the transformed IMU data 318.

Figure 4:
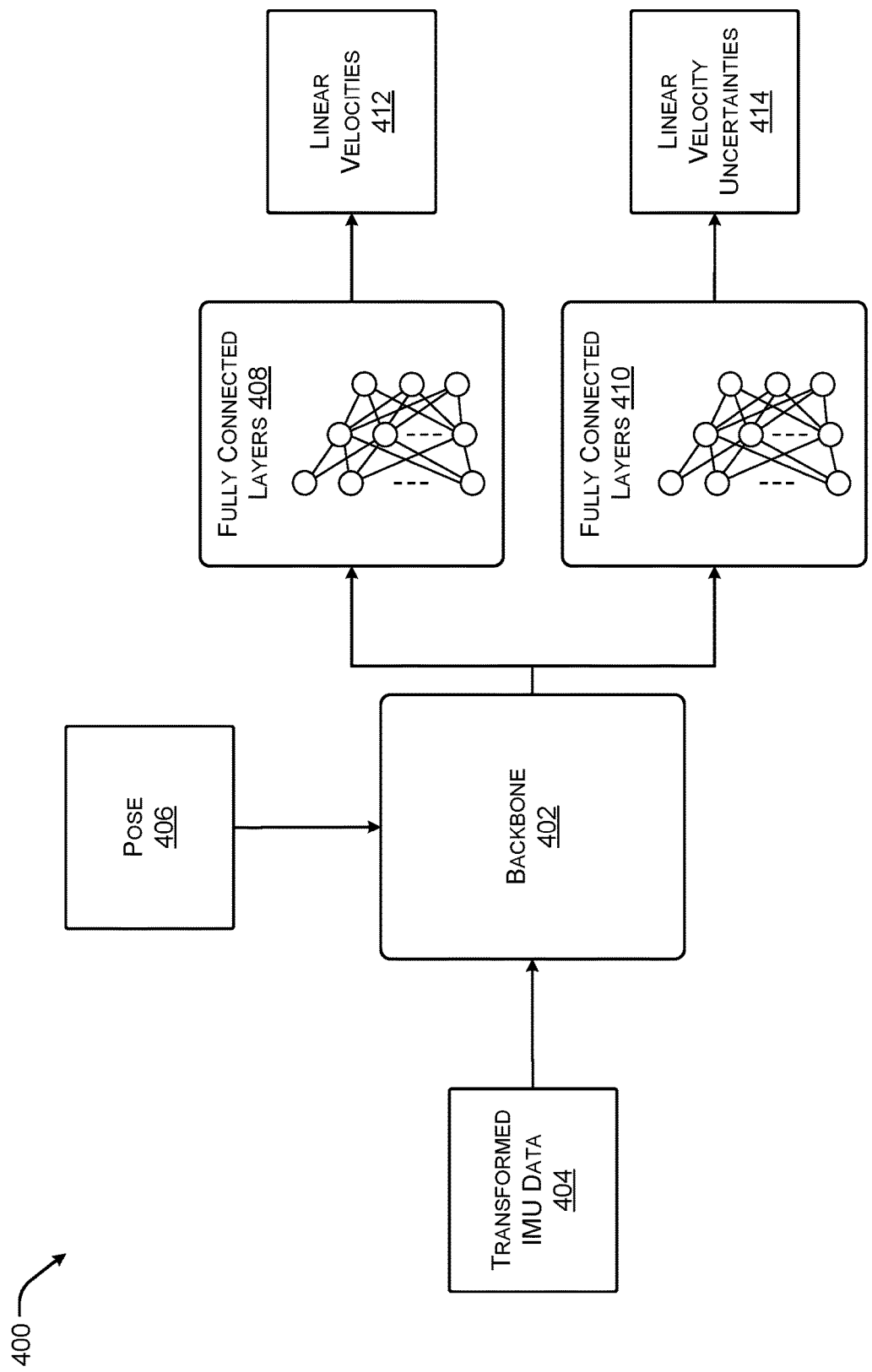
FIG. 4 is an example pictorial diagram of a machine learned network associated with a deep inertial prediction system according to some implementations.

FIG. 4 is an example pictorial diagram of a machine learned network 400 associated with a deep inertial prediction system according to some implementations. As discussed above, a backbone 402 of the machine learned network (or models) 400 may receive the transformed IMU data 404 from an IMU data transformation engine that may apply EKF biases, EKF gravity rotation and normals, and/or EKF yaw data to the IMU data and measurements. The backbone 402 may also receive a prior pose, such as pose 406 as an input. In some cases, the backbone 402 may extract features from the transformed IMU data 404 to supply to the fully connected layers 408 and 410.

The fully connected layers 408 may be trained to output a linear velocity 412, such as a linear velocity estimates of the associated device being tracked based at least in part on the features of the transformed IMU data 404 provided by the backbone 402. The linear velocity 412 may be IMU gravity aligned and without yaw (e.g., without a 3D vector). The fully connected layers 410 may be trained to output linear velocity uncertainties 414 associated with the linear velocity 412 output by the fully connected layers 408. The linear velocity uncertainties 414 may be a confidence value that is parametrized as diagonal entries of a covariance of the linear velocity 412. In some cases, by having two independent connected layers 408 and 412, the machine learned network 400 may allow for faster regression heads and higher quality generalization. In some cases, the linear velocity 412 and the linear velocity uncertainties 414 may be utilized to determine a velocity loss (e.g., a criterion used for training the neural network or machine learned model, such as to train the models or networks to minimize velocity loss). In some cases, the fully connected layers 408 and 410 may be in the form of 512-63-3.

Figure 5:
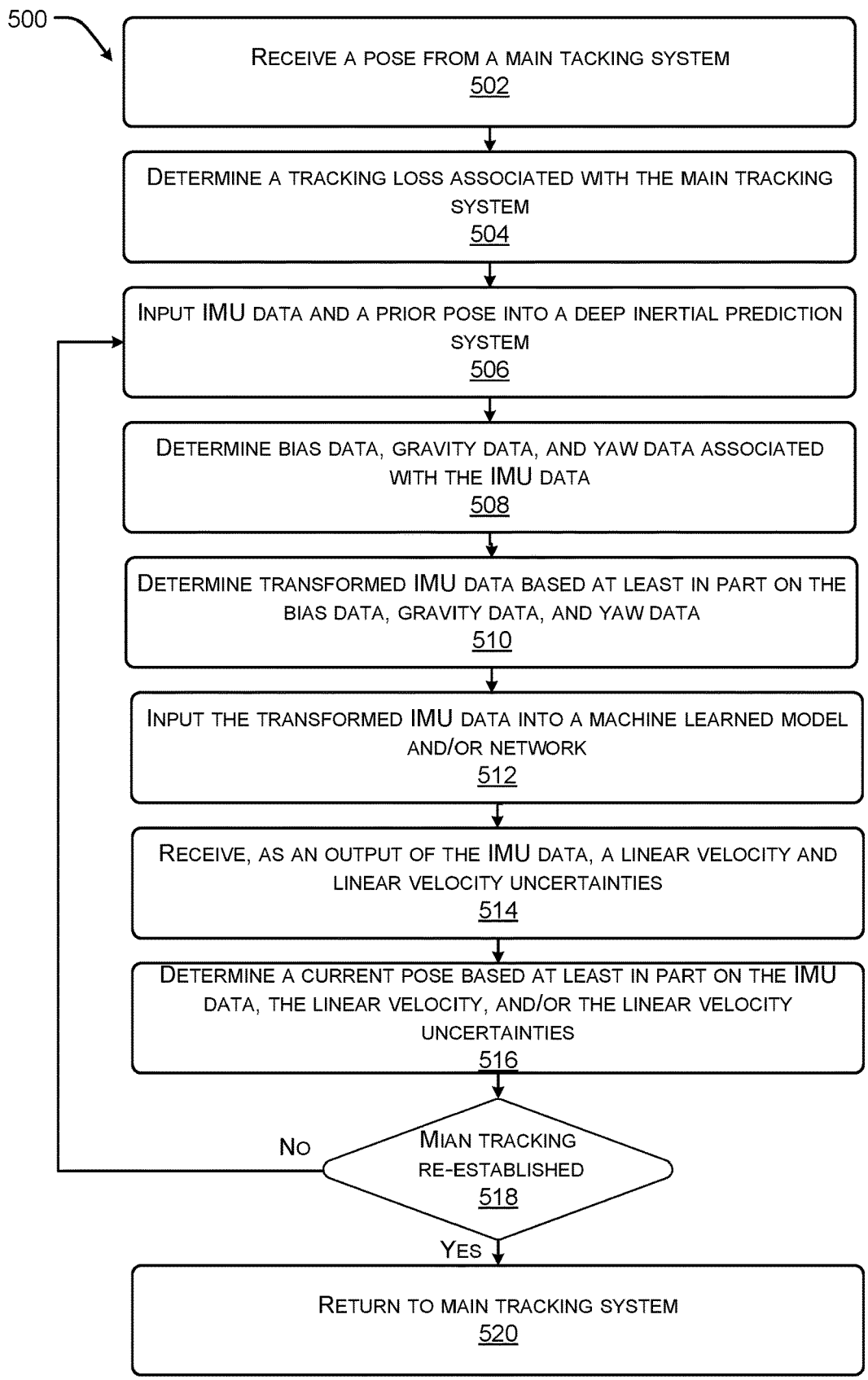
FIG. 5 is an example flow diagram showing an illustrative process for tracking a pose of an associated device according to some implementations.

FIG. 5 is a flow diagram illustrating example processes associated with tracking a pose of a device according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 5 is an example flow diagram showing an illustrative process 500 for tracking a pose of an associated device according to some implementations. As discussed above, a main tracking system, such as a SLAM system, may track the pose of a device (e.g., a hand-held controller) associated with an extended reality system (e.g., a headset device). However, in some cases, the headset device may lose visual tracking of the controller and introduce tracking loss via the SLAM system. In these cases, the headset device may include a deep inertial prediction system as a fallback tracking system until visual tracking via the SLAM system can resume (e.g., the controller is moved back into a field of view of image devices of the headset device).

At 502, the extended reality system may receive a pose from a main tracking system. For example, the extended reality system may receive a pose associated with each frame or at periodic frame intervals a pose from a tracking system utilizing image data of the device being tracked. In some cases, the pose may be a 6DOF pose of the device or object and may be utilized as an input to the extended realty system (such as a user selection or interaction).

At 504, the extended reality system may determine that a tracking loss associated with the main tracking system has occurred. For instance, the tracked device may leave the field of view of the image device, the image device may become obstructed, or the like.

At 506, the extended reality system may input IMU data and a prior pose (e.g., the last valid pose from the main tracking system) into a deep inertial prediction system. For instance, the deep inertial prediction system may act as a fallback tracking system that engages or enables when the main tracking is lost.

At 508, the deep inertial prediction system may determine bias data, gravity data, and yaw data associated with the IMU data. For example, as the IMU data is received from the tracked device, the IMU data maybe input into an EKF that generates IMU biases, gravity rotations and normals, and/or yaw measurements.

At 510, a IMU data transformation engine of the deep inertial prediction system may apply the bias data, gravity data, and yaw data to the IMU data to generated transformed IMU data. The transformed IMU data may be are transformed IMU data and IMU measurements that are gravity aligned and without yaw or biases.

At 512, the transformed IMU data may be input into a machine learned model and/or network, such as the machine learned model or network of FIG. 4. In some cases, the machine learned model or network may be a deep neural network or a convolutional neural network. The network may be trained using extended reality data (e.g., IMU data) as well as synthetically generated training data. For example, the training data may include trajectories based on realistic (or historic) virtual reality or augmented reality motion. The simulated motion data may also be used and generated based on real virtual reality or augmented reality trajectories to improve training data sets. For example, the data generation system may receive discrete poses associated with a user in an extended reality environment. Continuous position and orientation data may be generated from the discrete poses, such as via a cubic three-dimensional (3D) B-spline function. The continuous position and orientation data may then be used to generate ground-truth poses (for instance including IMU measurements, angular velocity, acceleration) that may be utilized to train the machine learned models and networks. The training data may also modify the ground-truth poses by adding errors and noise. The errors and noise ensures the training data is more representative of real life applications (e.g., non-simulated data). In some cases, variable-duration tracking loss may be injected into the training data at different moments (such as based on real tracking system failures or at random event times).

At 514, the deep inertial prediction system may receive a linear velocity and linear velocity uncertainties from the machine learned model and/or network, such as the output of two fully connected layers. For example, the output may include a linear velocity from the first fully connected layers and linear velocity uncertainties from the second fully connected layers.

At 516, the EKF of the deep inertial prediction system may determine a current pose based at least in part on the IMU data, the linear velocity, and/or the linear velocity uncertainties. The pose may be a 6DOF pose that is usable by the extended reality system to determine user inputs and/or interactions with the virtual environment.

At 518, the extended reality system may determine if the main tracking may be re-established. For instance, the tracked device may re-enter the field of view of the image devices. If the main tracking is re-established, the process 500 advances to 520, and the extended reality system uses the poses output by the main tracking system. Otherwise, the process 500 returns to 506 and the deep inertial prediction system determines another pose.

Figure 6:
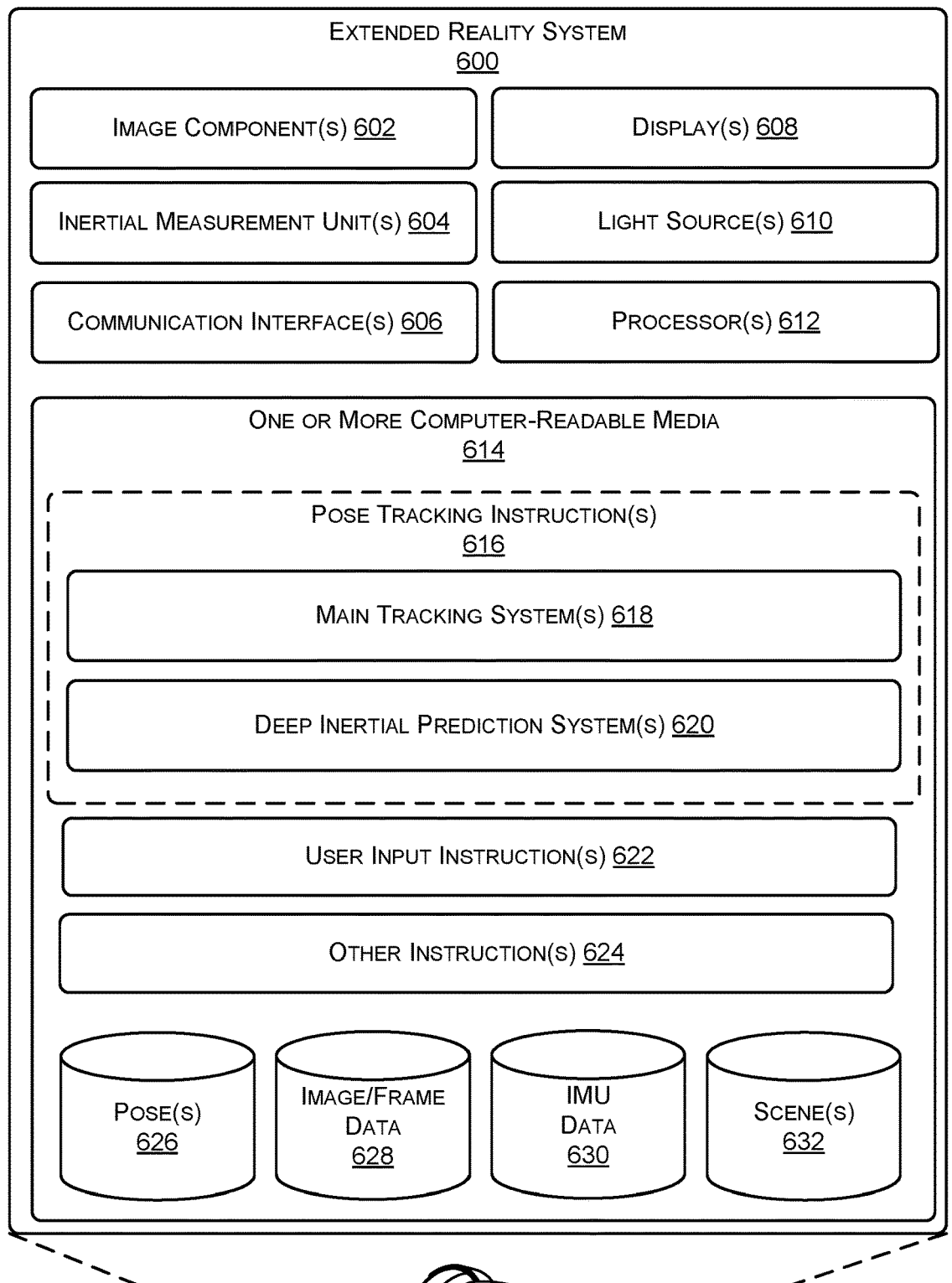
FIG. 6 illustrates an example extended reality system according to some implementations.

FIG. 6 is an example extended reality system 600 according to some implementations. As described herein, the extended reality system 600 may include image components 602 for capturing visual data, such as image data or frames, from a physical environment. For example, the image components 602 may be positioned to capture multiple images from substantially the same perspective as the user (e.g., a position proximate the user's eyes or head) in order to incorporate the image data associated with the captured image into the virtual environment. The image components 602 may be of various sizes and quality, for instance, the image components 602 may include one or more wide screen cameras, 3D cameras, high definition cameras, video cameras, among other types of cameras. In general, the image components 602 may each include various components and/or attributes. As an illustrative example, the image component 602 may include a stereo image system that includes at least two color image devices a depth sensor.

In the current example, the image components 602 may be usable to capture data representative of one or more tracked devices (such as one or more hand-held controllers). For instance, the pose of a tracked devices or other object may be determined with respect to a perspective of the headset device 200 and/or the user that may change as the extended reality system 600. Thus, the extended reality system 600 may include one or more IMUs 604 to determine the orientation data of the extended reality system 600 (e.g., acceleration, angular momentum, pitch, roll, yaw, etc. of for instance the image components 602).

The extended reality system 600 may also include one or more communication interfaces 606 configured to facilitate communication between one or more networks, one or more cloud-based management system, and/or one or more physical objects. The communication interfaces 606 may also facilitate communication between one or more wireless access points, a master device, and/or one or more other computing devices as part of an ad-hoc or home network system. The communication interfaces 606 may support both wired and wireless connections to various networks, such as cellular networks, radio, WiFi networks, short-range or near-field networks (e.g., Bluetooth®), infrared signals, local area networks, wide area networks, the Internet, and so forth. In some cases, the communication interfaces 606 may be configured to receive IMU data 630 associated with the tracked device or object from the device, such as the controllers. For example, the controllers may also be equipped with one or more IMUs and configured to send the captured IMU data 630 of each controller to the extended reality system 600 via the communication interfaces 206.

In the illustrated example, the extended reality system 600 also includes a display 608, such as a virtual environment display or a traditional 2D display. For instance, in one example, the display 608 may include a flat display surface combined with optical lenses configured to allow a user of the extended reality system 600 to view the display 608 in 3D, such as when viewing a virtual environment.

The extended reality system 600 may also include one or more light sources 610. In some cases, the light sources 610 may be configured to activate according to a predetermined schedule, such as based on an exposure interval of the image components 602 and be usable together with the image data 628 (or depth data from a depth sensor) to assist in determine the pose of the tracked object or other environmental features. In another example, the light source 210 may be an infrared illuminator.

The extended reality system 600 may also include one or more processors 612, such as at least one or more access components, control logic circuits, central processing units, or processors, as well as one or more computer-readable media 614 to perform the function associated with the virtual environment. Additionally, each of the processors 612 may itself comprise one or more processors or processing cores.

Depending on the configuration, the computer-readable media 614 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 612.

Several modules such as instruction, data stores, and so forth may be stored within the computer-readable media 614 and configured to execute on the processors 612. For example, as illustrated, the computer-readable media 614 may store pose tracking instructions 616 that may include both a main tracking system 618 and a deep inertial prediction system 620. The computer-readable media 614 may also store user input instructions 622 as well as other instruction 624, such as an operating system. Data may also be stored on the computer-readable media 614, such as poses 626, image data 628, IMU data 630 (e.g., received from one or more tracked devices), and/or scenes or virtual environment data 632.

The main tracking system 618 may be a SLAM based tracking system that relies on the image data 628 and the IMU data 630 received from the tracked device (as well as IMU data from the IMU 604 of the extended reality system 600) to track and determine the pose of the tracked device.

The deep inertial prediction system 620 may engage when the main tracking system 618 is unable to provide a pose within a desired confidence threshold (e.g., the drift or error in the pose estimate is greater than or equal to a threshold). For instance, the deep inertial prediction system 620 may be initialized from state information, status (e.g., tracking status), or prior pose from the main tracking system 618. The deep inertial prediction system 620 may utilize a machine learned models and networks, such as a convolutional neural network (CNN), trained to compute linear velocity and linear velocity uncertainties from a window (or set) of past IMU data 630 together with one or more EKF configured to output a pose by integrating the current IMU data 630 and regressing the velocities as a measurement.

The user input instructions 622 may be configured to receive one or more poses of one or more tracked devices and to perform various operations based on the pose. For instance, the user input instructions 622 may be configured to use the pose of the one or more controllers as a user input to select or manipulate items or objects within the extended reality environment.

Although the subject matter has been described in language specific to structural features, it is to be understood that the subject matter defined in the appended claims is not necessarily limited to the specific features described. Rather, the specific features are disclosed as illustrative forms of implementing the claims.

Example Clauses

A. A method comprising: initializing, based at least in part on data associated with a prior pose of a tracked device, an Extended Kalman Filter of a deep inertial prediction system; inputting a window of inertial measurement unit (IMU) measurements into a machine learned network, the IMU measurements associated with the tracked device; receiving, by the Extended Kalman Filter and from the machine learned network, a linear velocity and uncertainty data associated with the linear velocity; and determining, by the Extended Kalman Filter, a current pose of the tracked device based at least in part on the linear velocity and the uncertainty data.

B. The method as recited in any of claim A, further comprising responsive to determining that a pose output by a main tracking system of the extended reality system has a confidence score below a threshold confidence value, engaging the deep inertial prediction system.

C. The method as recited in claim B, wherein determining that the pose output by the main tracking system has a confidence score below the threshold confidence value further comprises determining that the tracked device is no longer represented in the image data being generated by an image device associated with the extended reality system.

D. The method as recited in claim A, wherein the data associated with a prior pose comprises a status of a main tracking system.

E. The method as recited in claim A, wherein the machine learned network is a deep neural network having a first set of fully connected layers to output the linear velocity and a second set of fully connected layers to output uncertainty data associated with the linear velocities.

F. The method as recited in claim A, further comprising: determining, by the Extended Kalman Filter, bias data, gravity data, and yaw data associated with the tracked device; generating, by an IMU data transformation engine, transformed IMU data based at least in part on the IMU data and one or more of the bias data, the gravity data, or the yaw data; and wherein the window of IMU measurements input into the machine learned network includes the transformed IMU data.

G. The method as recited in claim F, wherein the bias data includes Extended Kalman Filter biases and the gravity data includes Extended Kalman Filter gravity rotation and normals.

H. A system comprising: a display for presenting an extended reality scene to a user; one or more image devices for capturing image data associated with a tracked device; one or more communication interfaces for receiving inertial measurement unit (IMU) measurements from the tracked device; one or more processors; non-transitory computer-readable media storing computer-executable instructions, which when executed by the one or more processors cause the one or more processors to perform operations comprising: inputting the IMU measurements into a machine learned network of a first tracking component; receiving, from the machine learned network, a linear velocity associated with the tracked device and uncertainty data associated with the linear velocity; and determining a current pose of the tracked device based at least in part on the linear velocity and the uncertainty data.

I. The system as recited in claim H, wherein the operations further comprise initializing an Extended Kalman Filter based at least in part on data associated with a prior pose of the tracked device determined by a second tracking component of the system, the second tracking component different than the first tracking component.

J. The system as recited in claim H, wherein the operations further comprise responsive to determining that a pose output by a second tracking component of the system has a confidence score below a threshold confidence value, engaging the first tracking system.

K. The system as recited in claim H, wherein the machine learned network is a deep neural network having a first set of fully connected layers to output the linear velocity and a second set of fully connected layers to output uncertainty data associated with the linear velocities.

L. The system as recited in claim H, wherein the operations further comprise: determining bias data, gravity data, and yaw data associated with the tracked device; generating transformed IMU measurements based at least in part on the IMU measurements and one or more of the bias data, the gravity data, or the yaw data; and wherein inputting the IMU measurements into the machine learned network comprises inputting the transformed IMU data into the machine learned network.

M. The system as recited in claim L, wherein the bias data includes Extended Kalman Filter biases and the gravity data includes Extended Kalman Filter gravity rotation and normals.

N. The system as recited in claim H, wherein the machine learned model is at least partially trained using synthetic ground truth poses generated based at least in part on historical trajectories of tracked devices, the synthetic ground truth poses adjusted based at least in part by applying at least one of white Gaussian IMU noise, IMU biases, or IMU intrinsic.

O. One or more non-transitory computer-readable media storing instructions that, when executed, cause one or more processors to perform operations comprising: initializing, based at least in part on data associated with a prior pose of a tracked device, an Extended Kalman Filter of a deep inertial prediction system; inputting a window of inertial measurement unit (IMU) measurements into a machine learned network, the IMU measurements associated with the tracked device; receiving, by the Extended Kalman Filter and from the machine learned network, a linear velocity and uncertainty data associated with the linear velocity; and determining, by the Extended Kalman Filter, a current pose of the tracked device based at least in part on the linear velocity and the uncertainty data.

P. The one or more non-transitory computer-readable media of claim O, the operations further comprising responsive to determining that a pose output by a main tracking system of the extended reality system has a confidence score below a threshold confidence value, engaging the deep inertial prediction system.

Q. The one or more non-transitory computer-readable media of claim P, wherein determining that the pose output by the main tracking system has a confidence score below the threshold confidence value further comprises determining that the tracked device is no longer represented in the image data being generated by an image device associated with the extended reality system.

R. The one or more non-transitory computer-readable media of claim O, wherein the data associated with a prior pose comprises a status of a main tracking system.

S. The one or more non-transitory computer-readable media of claim O, wherein the machine learned network is a deep neural network having a first set of fully connected layers to output the linear velocity and a second set of fully connected layers to output uncertainty data associated with the linear velocities.

T. The one or more non-transitory computer-readable media of claim O, the operations further comprising: determining, by the Extended Kalman Filter, bias data, gravity data, and yaw data associated with the tracked device; generating, by an IMU data transformation engine, transformed IMU data based at least in part on the IMU data and one or more of the bias data, the gravity data, or the yaw data; and wherein the window of IMU measurements input into the machine learned network includes the transformed IMU data.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
  initializing, based at least in part on data associated with a prior pose of a tracked device, an Extended Kalman Filter of a deep inertial prediction system;
  inputting a window of inertial measurement unit (IMU) measurements into a machine learned network, the IMU measurements associated with the tracked device;
  receiving, by the Extended Kalman Filter and from the machine learned network, a linear velocity and uncertainty data associated with the linear velocity; and
  determining, by the Extended Kalman Filter, a current pose of the tracked device based at least in part on the linear velocity and the uncertainty data.

2. The method as recited in any of claim 1, further comprising:
  responsive to determining that a pose output by a main tracking system of the extended reality system has a confidence score below a threshold confidence value, engaging the deep inertial prediction system.

3. The method as recited in claim 2, wherein determining that the pose output by the main tracking system has a confidence score below the threshold confidence value further comprises determining that the tracked device is no longer represented in the image data being generated by an image device associated with the extended reality system.

4. The method as recited in claim 1, wherein the data associated with a prior pose comprises a status of a main tracking system.

5. The method as recited in claim 1, wherein the machine learned network is a deep neural network having a first set of fully connected layers to output the linear velocity and a second set of fully connected layers to output uncertainty data associated with the linear velocities.

6. The method as recited in claim 1, further comprising:
  determining, by the Extended Kalman Filter, bias data, gravity data, and yaw data associated with the tracked device;
  generating, by an IMU data transformation engine, transformed IMU data based at least in part on the IMU data and one or more of the bias data, the gravity data, or the yaw data; and
  wherein the window of IMU measurements input into the machine learned network includes the transformed IMU data.

7. The method as recited in claim 6, wherein the bias data includes Extended Kalman Filter biases and the gravity data includes Extended Kalman Filter gravity rotation and normals.

8. A system comprising:
  a display for presenting an extended reality scene to a user;
  one or more image devices for capturing image data associated with a tracked device;
  one or more communication interfaces for receiving inertial measurement unit (IMU) measurements from the tracked device;
  one or more processors;
  non-transitory computer-readable media storing computer-executable instructions, which when executed by the one or more processors cause the one or more processors to perform operations comprising:
    initializing an Extended Kalman Filter based at least in part on data associated with a prior pose of the tracked device determined by a second tracking component of the system, the second tracking component different than the first tracking component;
    inputting the IMU measurements into a machine learned network of a first tracking component;
    receiving, from the machine learned network, a linear velocity associated with the tracked device and uncertainty data associated with the linear velocity; and
    determining a current pose of the tracked device based at least in part on the linear velocity and the uncertainty data.

9. The system as recited in claim 8, wherein the operations further comprise:
  responsive to determining that a pose output by a second tracking component of the system has a confidence score below a threshold confidence value, engaging the first tracking system.

10. The system as recited in claim 8, wherein the machine learned network is a deep neural network having a first set of fully connected layers to output the linear velocity and a second set of fully connected layers to output uncertainty data associated with the linear velocities.

11. The system as recited in claim 8, wherein the operations further comprise:
  determining bias data, gravity data, and yaw data associated with the tracked device;

generating transformed IMU measurements based at least in part on the IMU measurements and one or more of the bias data, the gravity data, or the yaw data; and wherein inputting the IMU measurements into the machine learned network comprises inputting the transformed IMU data into the machine learned network.

12. The system as recited in claim 11, wherein the bias data includes Extended Kalman Filter biases and the gravity data includes Extended Kalman Filter gravity rotation and normals.

13. The system as recited in claim 8, wherein the machine learned model is at least partially trained using synthetic ground truth poses generated based at least in part on historical trajectories of tracked devices, the synthetic ground truth poses adjusted based at least in part by applying at least one of white Gaussian IMU noise, IMU biases, or IMU intrinsic.

14. One or more non-transitory computer-readable media storing instructions that, when executed, cause one or more processors to perform operations comprising:
responsive to determining that a pose output by a main tracking system of the extended reality system has a confidence score below a threshold confidence value:
initializing, based at least in part on data associated with a prior pose of a tracked device, an Extended Kalman Filter of a deep inertial prediction system;
inputting a window of inertial measurement unit (IMU) measurements into a machine learned network, the IMU measurements associated with the tracked device;
receiving, by the Extended Kalman Filter and from the machine learned network, a linear velocity and uncertainty data associated with the linear velocity; and
determining, by the Extended Kalman Filter, a current pose of the tracked device based at least in part on the linear velocity and the uncertainty data.

15. The one or more non-transitory computer-readable media of claim 14, wherein determining that the pose output by the main tracking system has a confidence score below the threshold confidence value further comprises determining that the tracked device is no longer represented in the image data being generated by an image device associated with the extended reality system.

16. The one or more non-transitory computer-readable media of claim 14, wherein the data associated with a prior pose comprises a status of a main tracking system.

17. The one or more non-transitory computer-readable media of claim 14, wherein the machine learned network is a deep neural network having a first set of fully connected layers to output the linear velocity and a second set of fully connected layers to output uncertainty data associated with the linear velocities.

18. The one or more non-transitory computer-readable media of claim 14, the operations further comprising:
determining, by the Extended Kalman Filter, bias data, gravity data, and yaw data associated with the tracked device;
generating, by an IMU data transformation engine, transformed IMU data based at least in part on the IMU data and one or more of the bias data, the gravity data, or the yaw data; and
wherein the window of IMU measurements input into the machine learned network includes the transformed IMU data.

19. The one or more non-transitory computer-readable media of claim 14, wherein determining, by the Extended Kalman Filter, the current pose of the tracked device is based at least in part on a last valid pose from the main tracking system.

20. The one or more non-transitory computer-readable media of claim 14, wherein the threshold confidence value is a threshold drift in the pose estimate.

* * * * *